Patented Sept. 20, 1949

2,482,086

UNITED STATES PATENT OFFICE 2,482,086

RESINOUS COMPOSITIONS AND USE THEREOF IN FORMING ELECTRICAL MEMBERS AND LAMINATED PRODUCTS

Newton C. Foster, McKeesport, Pa., assignor to Westinghouse Electric Corporation, East Pittsburgh, Pa., a corporation of Pennsylvania No Drawing. Application April 1, 1944, Serial No. 529,173

20 Claims. (Cl. 154—43)

This invention relates to compositions which are capable of completely polymerizing into thermoset products without evolving water, gases, or other deleterious matter.

In producing resinous bodies for various purposes, it is desirable to employ a composition which initially is in a liquid state whereby it may be applied to various fibrous materials, porous solids and other fillers, or to electrical members such as windings, coils, cores, and the like, whereby a penetration of these members is readily secured. Once complete filling of the members or fillers has been secured, it is desirable that the composition be completely polymerized into a thermoset solid body without evolution of water, gases, or other undesirable products.

Certain compositions employed in the prior art, such, for example, as styrene, have some of these properties but the polymer of styrene is a thermoplastic resin which is so responsive to elevated temperatures that in many cases its use is not safe above 100° C.

The object of this invention is to provide a liquid composition which may be substantially completely polymerized into a thermoset resinous solid having predetermined properties.

A further object of the invention is to provide for copolymerizing liquid vinyl monomers with the reaction product of an ethylene alpha-beta dicarboxylic acid with mixed fatty acid esters of polyhydric alcohols.

A still further object of the invention is to provide for preparing laminated bodies from fibrous sheet material and the reaction product of a liquid vinyl monomer and a mixture of fatty acid esters reacted with an ethylene alpha-beta dicarboxylic acid.

Other objects of the invention will, in part, be obvious and will, in part, appear hereinafter.

It has been discovered that liquid vinyl monomers are capable of dissolving and of subsequently copolymerizing into a thermoset body with the reaction product of an ethylene alpha-beta dicarboxylic acid and mixed fatty acid esters one of which comprises a hydroxylated unsaturated fatty acid ester.

In preparing the reaction product to be dissolved in the liquid vinyl monomer, a number of ethylene alpha-beta dicarboxylic acids and their anhydrides can be employed. Insofar as cost and ease of reaction are concerned, maleic anhydride is particularly useful. Citraconic anhydride, chlormaleic anhydride and other anhydrides of ethylene alpha-beta dicarboxylic acids may be employed. The reaction is most conveniently carried out by the use of the dibasic anhydrides, though the corresponding normal dibasic acids can be employed by increase of temperature and the addition of suitable catalysts. The term "dicarboxylic acid" as used herein is intended to include both the normal acids and the anhydrides.

A mixture of fatty acid esters is reacted with the ethylene alpha-beta dicarboxylic acid. From 5% to 98% by weight, of the mixture of fatty acid esters is preferably composed of hydroxylated unsaturated fatty acid esters of polyhydric alcohols. The remainder may be composed of both saturated and non-hydroxylated unsaturated fatty acid esters. Castor oil is a convenient and commercially available hydroxylated unsaturated fatty acid ester of polyhydric alcohol. The esters of ricinoleic acid and a polyhydric alcohol such as ethylene glycol, propylene glycol, pentaerythritol and other poly alcohols may be employed to replace all or part of the castor oil.

Vegetable oils are a suitable source of fatty acid esters to be combined with the hydroxylated unsaturated fatty acid esters. Drying oils, such as linseed oil, tung oil, hemp seed oil, poppy seed oil, sunflower oil, walnut oil and oiticica oil; semi-drying oils such for example as corn oil, cotton seed oil, pumpkin seed oil, sesame and soy bean oil, and non-drying oils such as peanut oil and olive oils are examples of oils that may be admixed with castor oil, or other hydroxylated fatty acid esters. The esters of hydroxylated fatty acids, such as the polyhydric alcohol ester of hydroxy stearic acids, may be used similarly to the vegetable oils. If a resinous body is to be produced in which it is desired that surface oxidation take place, a drying oil such as linseed oil, may be employed in relatively large proportions. For soft and flexible resinous products, peanut oil can be reacted with the ethylene alpha-beta dicarboxylic acid.

Depending on the requirements, the selection and proportion of the oils and their relative ratio to the amount of castor oil, for example, may be varied within wide limits. In general, the greater the proportion of castor oil the harder will be the final thermoset product. If the proportion of a drying oil is increased, a thermoset resin having increased surface hardening characteristics with exposure to air will be obtained.

The reaction of the mixture of fatty acid esters and the ethylene alpha-beta dicarboxylic acid is somewhat complex. It is believed that when maleic anhydride reacts with the hydroxylated unsaturated fatty acid esters of the polyhydric alcohol, such as castor oil, a simple esterification takes place in which the half ester of the maelic anhydride is formed. One, two or three molecules of maleic anhydride can be reacted with one molecule of castor oil since the castor oil contains three ricinoleic acid radicals each of which has a hydroxy group at which the esterification of the dibasic acid anhydride may occur. The full half ester is particularly desirable for the purpose of the invention since the maximum degree of cross-linkage will be obtained in the final resinous product. The full half ester produced by reacting three mols of maleic anhydride with one mol of castor oil probably has the following composition:

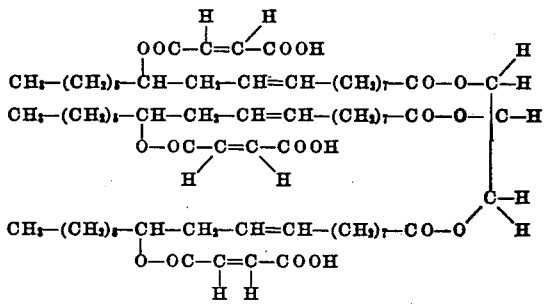

The monomaleate half ester of castor oil and the dimaleate of castor oil may also be used in carrying out the invention. In general, from three to ten parts, by weight, of maleic anhydride for every thirty parts, by weight, of castor oil will produce a reaction product having satisfactory characteristics.

The non-hydroxylated oil component of the mixture probably reacts with an unsaturated dibasic anhydride, such as maleic anhydride, by ester interchange and the Diels-Alder addition reaction, depending on the molar proportions of the ethylene alpha-beta dicarboxylic acid as well as the conditions of the reaction. The reaction product secured will vary to some extent on these conditions of reaction. However, at least one mol of the ethylene alpha-beta dicarboxylic acid, such as maleic anhydride, should be present for each mol of the fatty acid esters in the mixture.

The reaction products of the mixtures of various oils and the ethylene alpha-beta dicarboxylic acids or their anhydrides are generally syrupy or soft gummy substances. They may be dissolved in liquid vinyl monomers in the proportions of from 10 parts to 95 parts by weight of liquid vinyl monomers to 90 parts to 5 parts by weight of the reaction product. The following examples are typical of the compositions which have been prepared:

Example No. I 80 parts linseed oil, 20 parts castor oil, and 30 parts maleic anhydride was heated with stirring at 175° C. to 190° C. for 8 to 12 hours. A syrupy product was obtained. 75 parts of the reaction product were mixed with 25 parts monostyrene. One-half of one percent of benzoyl peroxide, by weight, was added and the mixture heated in a mold at 125° C. for one hour. A soft and flexible resinous body was produced. The shrinkage was less than 8% of the volume of the liquid. When heated further, a hard oxidized layer formed on the surface of the resin.

Example No. II

A mixture of 80 parts of peanut oil, 20 parts of castor oil, and 25 parts of maleic anhydride were reacted at 175° C. to 190° C. for ten hours. 50 parts of this product were mixed with 50 parts by weight of styrene and one-half part benzoyl peroxide. When heated at 125° C., the mixture polymerized in three hours. The product was brown in color though transparent. The copolymer was relatively soft and quite flexible. When heated in contact with the atmosphere, the surface of the resin formed a slight exidized layer but at a rate many times slower than the resin of Example No. I.

Example No. III 50 parts of corn oil, 50 parts of castor oil, and 30 parts of maleic anhydride were reacted for 12 hours at 175° C. to 190° C. 75 parts of monostyrene by weight and 25 parts of the reaction product were mixed with one-half part benzoyl peroxide. Heating for one hour at 135° C. produced a tough flexible resinous body harder than that of Examples I and II.

Example No. IV

A mixture of 20 parts by weight of castor oil, 60 parts of linseed oil, 20 parts peanut oil, and 30 parts maleic anhydride was heated at a temperature of 175° C. to a thick syrup. The reaction product was dissolved in 30 parts by weight of monostyrene to 30 parts by weight of linseed oil, castor oil, peanut oil maleate and .3% benzoyl peroxide was added. The liquid composition was applied to completely impregnate a coil of insulated wire and heated at 135° C. for one hour. A solid resinous body was produced in which the windings were embedded completely. The presence of peanut oil prevented undue surface oxidation.

In forming a liquid composition, various liquid monomers having the group $H_2C=C<$ have been found satisfactory solvents for the reaction product of the maleic anhydride and mixed fatty acid esters. Monostyrene is one highly effective copolymerizable solvent. Nuclearly chlorinated and monoalkyl nuclear substituted styrenes are similarly effective for the practice of the invention; paramethyl styrene and parachlor styrene being typical examples. Other monomers having the group $H_2C=C<$ such, for example, as alpha-methyl styrene, alpha methyl para methyl styrene, vinyl acetate and other vinyl esters, methyl vinyl ketone, acrylic nitrile, methyl methacrylate and allyl esters, such as diallyl phthalate have been copolymerized with the ester reaction product with successful results.

The use of higher proportions of a monomer having the group $H_2C=C<$, such as styrene, results in a harder product. The 90% and higher styrene copolymers are quite hard, whereas the copolymers having 75% and less styrene are relatively more flexible and elastic. For service involving shock and stresses, the use of the copolymer having 25% or more of the reaction product of the mixture of fatty acid esters and dibasic acid is therefore suggested.

As one example of the use of different combinations of resins to meet certain conditions, the interstices of a coil may be impregnated with a relatively hard thermoset resin composed of 90% styrene and 10% ester reaction product, while the exterior of the coil may be coated with a more flexible resin composed of 70% of the reaction product and 30% of styrene and including a considerable quantity of mica powder.

In order to prevent spontaneous polymerization and undue thickening of the solution in the liquid vinyl monomer, it is desirable to incorporate a small quantity of inhibitor in the solution. The addition of 1/10 of 1% or less of hydroquinone has been satisfactory in preventing undue thickening due to such spontaneous polymerization. Particularly with the solutions having higher proportions of monostyrene the addition of an inhibitor may be indicated. When a catalyst, such for example as a peroxide or an ozonide is added, sufficient should be employed to compensate for the inhibitor present.

The viscosity of the solution may be varied widely in order to meet various requirements. Thus a solution composed of 25% monostyrene and 75% of a castor oil-linseed oil-maleate reaction product may have a viscosity of from 100 to 1,000 centipoises, depending on the ratio of castor oil to linseed oil and the proportion of maleic anhydride reacted with the oils. Higher viscosities may be produced by dissolving polystyrene in the monostyrene before the oil mixture- maleic anhydride reaction product is added. Indene or cyclopentadiene polymers may be added instead of polystyrene in order to increase the viscosity of the liquid.

It has been discovered that the addition of finely divided inorganic solids gives products which have not only high viscosities but possess highly desirable thixotropic properties. The styrene solution of Example I was evacuated in a sealed flask and 35 parts by weight of 325 mesh mica was combined with 65 parts of the solution by vigorous stirring in the evacuated flask. A thick viscous golden brown resinous material is produced. At a temperature of 25° C. it had a viscosity of from 200,000 to 400,000 centipoises.

This viscous material carrying mica was exceptionally adapted for encapsulating electrical coils, transformers and other electrical apparatus. By dipping members into the material, a surface coating of about 15 mils in thickness was produced. Due to its thixotropy the resinous material set rapidly and did not run off on standing. The resin did not penetrate appreciably into the fine interstices of the cores or coils. However, gaps of as much as 1/8 of an inch were easily bridged without any surface cracks or other discontinuities occurring. The resin polymerized into a tough coating in less than one hour at 135° C.

Mica in the finely divided state may be added to the resinous compositions described herein in amounts of from 25 parts to 50 parts by weight to 75 parts to 50 parts of the composition. In combining finely divided mica with the solution, the mixing is easily accomplished in a vacuum. Other finely divided insulating inorganic materials, such as powdered asbestos, silica, powdered glass, and the like, may be incorporated in the liquid solution.

To secure improved resistance to flame and fire, chlorinated and fluorinated organic compounds having a zero dipole moment may be added in amounts of as high as 50% of the weight of the solution. Hexachlordiphenyl, tetrachlordifluoroethane and 50% to 60% fluorinated diphenyl may be added.

Laminated members for use as electrical supports, panels and other insulating structures may be prepared by coating sheets of paper, cotton cloth, asbestos paper, asbestos cloth and glass fabric, both woven and felted, may be impregnated with the solutions of the vinyl monomer and the reaction product of an ethylene alpha-beta dicarboxylic acid and the mixed fatty acid esters. The sheets so impregnated may be superimposed and heated at temperatures of from 100° C. to 180° C. under pressures of about from 2 to 50 pounds per square inch to produce a thermoset body. Likewise, fibrous and finely divided solids may be admixed in the resin and poured into molds or otherwise applied to members and when polymerized by heat-treatment solid bodies are produced.

The thermoset resinous copolymers produced by heat treating the solutions possess numerous desirable properties. The electrical properties are exceptionally outstanding as compared to other thermoset resins previously known in the art. At 1,000 cycles and 25° C., a particular resin comprising 85% styrene and 15% maleate reaction product had power factor values of from 0.13 to 0.25%. A resin produced by copolymerization of 75% of the reaction product and 25% styrene had power factor values ranging from 2% to 4% under the same conditions.

The temperature coefficient of power factor is low. Thus in a given coil impregnated with the thermoset resin and tested at 100 cycles at 25° C., the power factor was 1.1%, while at 125° C. it was 1.2%. At a frequency of one megacycle at 125° C., the power factor of the coil was only 3.9%.

The physical properties of the copolymer are valuable for many applications. Above 80° C., the copolymer becomes slightly elastic or rubbery. This enables the thermoset resin to accommodate stresses due to thermal expansion of members in which it is incorporated and when the stresses are removed the resin will return to its normal shape without cracking or failing. For example, when applied to a coil in a motor, the thermal expansion induced by running the motor at high capacity or with overloads will cause considerable changes in dimensions of the coils and the slots in the cores in which the coils are disposed. The resin of this invention will accommodate itself to the various stresses much more satisfactorily than other resins known heretofore.

A valuable feature of the copolymer as compared to many varnishes and resins resides in the fact that when heated to high temperatures for long periods of time, it does not give off corrosive organic acids as do many varnishes employed as wire enamels, tape impregnants and the like which have caused corrosion of the metal with which the resins have been associated. The thermoset resinous products of this invention can be safely employed at elevated temperatures in contact with corrosion sensitive metals such as iron, steel, aluminum and the like.

The resins produced by copolymerizing the vinyl monomer solution have excellent heat and water resistance. Transformer units encapsulated with the copolymer have been tested by dipping in hot salt water at 65° C. for two hours and immersing in salt water at 0° C. for two hours, the treatment being repeated four times without any significant changes in the original dielectric resistance of over a million megohms. In another test, encapsulated transformer units were baked in an oven at 80° C. for several hours, then refrigerated at a temperature of −50° C. for several hours and the cycle repeated. The insulation resistance remained at a high value throughout this severe test. A coil immersed for one month in tap water up to its leads retained its original resistance of over 1,000,000 megohms.

Petroleum oils and many other hydrocarbon compounds did not cause any significant swelling or deterioration of a sample of the copolymer immersed in the oils even when heated at 90° C. for months.

In particular, the resin adheres to metal such as copper leads and the like so well that water will not penetrate between the resin and the lead. The leads may be flexed without separation of the resin therefrom. Field coils treated with one of the softer resins may be handled and bent severely as is required during installation of the coils, without cracking or other undesirable results.

Since certain changes in carrying out the above process and certain modifications may be made without departing from its scope, it is intended that all the matter contained in the above description shall be interpreted as illustrative and not in a limiting sense.

I claim as my invention:

1. A composition comprising, in combination, the reaction product of a mixture of castor oil and another vegetable oil, and at least a molar equivalent but not in substantial excess of the mols of acyl radicals in the oils of maleic anhydride, and a solvent for the reaction product, the solvent comprising a liquid monomer having the group $H_2C=C<$.

2. A composition comprising, in combination, a solution composed of from 10 to 95 parts by weight of a liquid monomer having the group $H_2C=C<$ and from 90 to 5 parts by weight of the reaction product of at least one mol of maleic anhydride and one mol of a mixture of castor oil and another vegetable oil, and finely divided mica incorporated in the solution the mols of maleic anhydride not exceeding the mols of acyl radicals in the oils.

3. A composition comprising, in combination, a solution composed of from 10 to 95 parts by weight of a liquid monomer having the group $H_2C=C<$ and from 90 to 5 parts by weight of the reaction product of at least one mol of an acidic compound selected from the group consisting of ethylene alpha-beta dicarboxylic acids and anhydrides thereof and one mol of a mixture of castor oil and another vegetable oil the mols of acidic compound not exceeding the mols of acyl radicals in the oils.

4. An electrical member comprising, in combination, a conductor and electrical insulation applied thereto, the insulation comprising the polymerized product of a solution composed of a monomer having the group $H_2C=C<$ having dissolved therein the reaction product of a mixture of castor oil and another vegetable oil, and at least a molar equivalent but not in substantial excess of the mols of acyl radicals in the oils of an acidic compound selected from the group consisting of ethylene alpha-beta dicarboxylic acids and anhydrides thereof.

5. An electrical member comprising, in combination, a conductor and electrical insulation applied thereto, the insulation comprising the polymerized product of a solution composed of from 10 to 95 parts by weight of a monomer having the group $H_2C=C<$ having dissolved therein from 90 to 5 parts by weight of the reaction product of a mixture of castor oil and another vegetable oil, and at least a molar equivalent but not in substantial excess of the mols of acyl radicals in the oils of an acidic compound selected from the group consisting of ethylene alpha-beta dicarboxylic acids and anhydrides thereof.

6. A laminated member comprising a plurality of sheets of fibrous material and a binder impregnating the sheets and bonding them together, the binder composed of the copolymer of a monomer having the group $H_2C=C<$ and the reaction product of at least one mol of an acidic compound selected from the group consisting of ethylene alpha-beta dicarboxylic acids and anhydrides thereof and one mol of a mixture of castor oil and another vegetable oil, the mols of acidic compound not substantially exceeding the mols of the acyl radicals in the oils.

7. A composition comprising, in combination, the reaction product of a mixture of from 5 to 98 parts of castor oil, from 95 to 2 parts of linseed oil and at least a molar equivalent of the mols of the oil mixture of maleic anhydride, the mols of maleic anhydride not exceeding the mols of acyl radicals in the oils, and monostyrene to dissolve the reaction product to form a solution.

8. A member comprising a thermoset resinous composition comprising the copolymer of a liquid monomer having the group $H_2C=C<$ and the reaction product of at least one mol of an ethylene alpha-beta dicarboxylic anhydride and one mol of a mixture of castor oil and another vegetable oil, the mols of anhydride not substantially exceeding the mols of acyl radicals in the oils.

9. A member comprising a thermoset resinous composition comprising the copolymer of from 10 to 95 parts by weight of a liquid monomer having the group $H_2C=C<$ and from about 90 to 5 parts by weight of the reaction product of at least one mol of an ethylene alpha-beta dicarboxylic anhydride and one mol of a mixture of castor oil and another vegetable oil, the mols of anhydride not substantially exceeding the mols of acyl radicals in the oils.

10. A thermoset resinous composition comprising, the copolymer of from 10 to 95 parts by weight of styrene and from 90 to 5 parts by weight of the reaction product of at least one mol of maleic anhydride and one mol of a mixture of castor oil and another vegetable oil, the mols of maleic anhydride not substantially exceeding the mols of acyl radicals in the oils.

11. A thermoset resinous composition comprising, the copolymer of from 10 to 95 parts by weight of styrene and from 90 to 5 parts by weight of the reaction product of at least one mol of maleic anhydride and one mol of a mixture of castor oil and linseed oil, the mols of maleic anhydride not substantially exceeding the mols of acyl radicals in the oils.

12. A composition comprising, in combination, the reaction product of a mixture of a ricinoleic acid ester of a polyhydric alcohol and a different vegetable oil, and at least a molar equivalent but not in substantial excess of the mols of the acyl radicals in the esters of an acidic compound selected from the group consisting of ethylene alpha-beta dicarboxylic acids and anhydrides thereof, and a solvent for the reaction product, the solvent comprising a liquid monomer having the group $H_2C=C<$.

13. A composition comprising, in combination, the reaction product of a mixture of a ricinoleic acid ester of a polyhydric alcohol and a different vegetable oil, and at least a molar equivalent but not in substantial excess of the mols of the acyl radicals in the esters of maleic anhydride, and a solvent for the reaction product, the solvent comprising monostyrene.

14. A composition comprising, in combination, the reaction product of a mixture of from 5 to 98 parts of a ricinoleic acid ester of a polyhydric alcohol and of from 95 parts to 2 parts by weight of a different vegetable oil, and at least a molar equivalent but not in substantial excess of the mols of the acyl radicals in the esters of an acidic compound selected from the group consisting of ethylene alpha-beta dicarboxylic acids and anhydrides thereof, and a solvent for the reaction product, the solvent comprising a liquid monomer having the group $H_2C=C<$.

15. A composition comprising, in combination, the reaction product of a mixture of from 5 to 98 parts by weight of castor oil and from 95 to 2 parts by weight of another vegetable oil, and at least a molar equivalent but not in substantial excess of the mols of acyl radicals in the oils of an acidic compound selected from the group consisting of ethylene alpha-beta dicarboxylic acids and anhydrides thereof, and a solvent for the reaction product, the solvent comprising a liquid monomer having the group $H_2C=C<$.

16. An electrical member comprising, in combination, a conductor and electrical insulation applied thereto, the insulation comprising the polymerized product of, a solution composed of a monomer having the group $H_2C=C<$ having dissolved therein the reaction product of a mixture of a ricinoleic acid ester of a polyhydric alcohol and a different vegetable oil, and from about three to ten parts by weight of an acidic compound selected from the group consisting of ethylene alpha-beta dicarboxylic acids and anhydrides thereof for every thirty parts by weight of the ester.

17. An electrical member comprising, in combination, a conductor and electrical insulation applied thereto, the insulation comprising the polymerized product of, a solution composed of from 10 to 95 parts by weight of a monomer having the group $H_2C=C<$ having dissolved therein from 90 to 5 parts by weight of the reaction product of a mixture of a ricinoleic acid ester of a polyhydric alcohol and a different vegetable oil, and from about three to ten parts by weight of an acidic compound selected from the group consisting of ethylene alpha-beta dicarboxylic acids and anhydrides thereof for every thirty parts by weight of the ester.

18. The process of producing solid resinous bodies which comprises dissolving in a liquid monomer having the group $H_2C=C<$ the reaction product of at least one mol of an acidic compound selected from the group consisting of ethylene alpha-beta dicarboxylic acids and anhydrides thereof and a mol of a mixture of a ricinoleic acid ester of a polyhydric alcohol and a different vegetable oil, the mols of the acidic compound not exceeding the mols of the acyl radicals in the esters, incorporating a polymerizing catalyst in the solution and heating the solution whereby copolymerization takes place without substantial evaporation.

19. The process of producing solid resinous bodies which comprises dissolving in a liquid monomer having the group $H_2C=C<$ the reaction product of at least one mol of an acidic compound selected from the group consisting of ethylene alpha-beta dicarboxylic acids and anhydrides thereof and a mol of a mixture of a ricinoleic acid ester of a polyhydric alcohol and a different vegetable oil, the mols of acidic compound not substantially exceeding the mols of the acyl radicals in the esters, admixing finely-divided inert inorganic solids to secure a predetermined viscosity in the solution, incorporating a polymerizing catalyst in the solution and heating the solution whereby copolymerization takes place without substantial evaporation.

20. A laminated member comprising a plurality of sheets of fibrous material and a binder impregnating the sheets and bonding them together, the binder composed of the copolymer of 10 to 95 parts by weight of a monomer having the group $H_2C=C<$ and 90 to 5 parts by weight of the reaction product of at least one mol of an acidic compound selected from the group consisting of ethylene alpha-beta dicarboxylic acids and anhydrides thereof and one mol of a mixture of castor oil and another vegetable oil, the mols of acidic compound not substantially exceeding the mols of the acyl radicals in the esters.

NEWTON C. FOSTER.

REFERENCES CITED

The following references are of record in the file of this patent:

UNITED STATES PATENTS

| Number | Name | Date |
|---|---|---|
| 1,784,008 | Herrmann | Dec. 9, 1930 |
| 1,835,619 | Walsh | Dec. 8, 1931 |
| 2,061,934 | Mueller-Cunradi | Nov. 24, 1936 |
| 2,195,362 | Ellis | Mar. 26, 1940 |
| 2,298,078 | Wolfe et al. | Oct. 6, 1942 |
| 2,307,588 | Jackson et al. | Jan. 5, 1943 |
| 2,314,701 | Harvey | Mar. 23, 1943 |
| 2,340,109 | D'Alelio | Jan. 25, 1944 |
| 2,392,710 | Wakeford et al. | Jan. 8, 1946 |

FOREIGN PATENTS

| Number | Country | Date |
|---|---|---|
| 598,732 | Germany | June 16, 1934 |
| 540,169 | Great Britain | Oct. 8, 1941 |

OTHER REFERENCES

Ellis, "Chemistry of Synthetic Resins," vol. 2, page 909, published by Reinhold Pub. Corp., N. Y., 1935.